Figure 1:
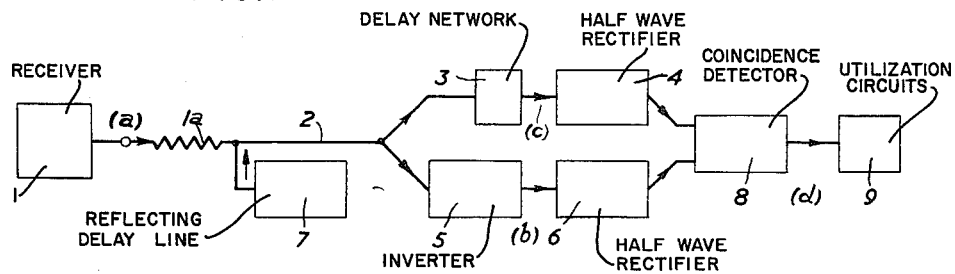

May 28, 1963      W. S. MORTLEY ETAL      3,091,763

RADAR SYSTEMS TO REDUCE CLUTTER

Filed Dec. 24, 1958

INVENTORS:
Wilfrid Sinden Mortley
Anthony Donald Slocombe
BY: Baldwin & Wight, ATTORNEYS

INVENTORS
WILFRID SINDEN MORTLEY,
ANTHONY DONALD SLOCOMBE

BY *Baldwin & Wight*

ATTORNEYS

3,091,763
RADAR SYSTEMS TO REDUCE CLUTTER

Wilfrid Sinden Mortley, Great Baddow, and Anthony Donald Slocombe, Felstead, England, assignors to Marconi's Wireless Telegraph Company Limited, London, England, a British company
Filed Dec. 24, 1958, Ser. No. 782,686
Claims priority, application Great Britain Aug. 15, 1958
7 Claims. (Cl. 343—17.1)

This invention, which is for improvements in or modifications of the invention contained in the specification accompanying co-pending application No. 720,412, relates to radar systems, and, like the parent invention, seeks to provide improved and relatively simple radar systems which will effectively distinguish desired targets, such as aircraft from targets, such as turbulent rainstorms, of the sort which are generally referred to by the word "clutter."

It is, of course, often desired to distinguish and display desired radar targets without their being masked by clutter and the now well known moving target indicator (M.T.I.) radar systems are commonly used for this purpose. In these systems desired targets, such as aircraft, are separated from clutter targets, such as rain storms, by taking advantage of the fact that, in general, the speed of movement of the desired targets is so greatly different from the usually much lower speeds of movement of clutter targets that separation may be effected by displaying only those targets whose speed of movement is within a predetermined range of speeds. Such M.T.I. radar systems use Doppler effect for separation of targets by speed, but in practice the velocities and directions of movement of some forms of clutter, notably turbulent rain storms, vary so much from time to time and from place to place that it is sometimes impossible to insert the correct Doppler frequency compensation to eliminate clutter targets and, even when it is possible to do this, it often takes so much time to discover what the correct Doppler frequency compensation is, as to make such radar systems far from satisfactory.

The present invention seeks to provide improved radar systems in which masking by clutter will be very much reduced but which do not possess the above mentioned defects of known M.T.I. radar systems. As will be seen later the invention like the parent invention, takes advantage of the fact that, in general, desired targets such as aircraft are very small in comparison with clutter targets such as rain storms and very small in comparison with the distance travelled in space by radio waves during the transmission of a normal radar pulse. Thus, for example, to quote a practical figure, a transmitted pulse of 5 $\mu$secs. duration will have a spatial existence of substantially 1500 meters. Accordingly, in general, radar pulses reflected by a target such as an aircraft will have at least approximately the same duration as the transmitted pulses, whereas reflections from rain storms and similar clutter targets will persist much longer. Incidentally it may be remarked that signals reflected from rain storms are sometimes discontinuous because sometimes reflected signals resulting from one half of a transmitted pulse will be received back at the station in phase opposition to reflected signals due to the other half thus producing in the received signal a narrow gap which may be likened to a negative signal. Both the present and the parent inventions take advantage of these differences between reflections from an aircrift or similar targets from reflections from a storm or similar target.

According to the parent invention a pulsed radar system comprises means for deriving from received video signals a signal wave form approximating that which would be obtained by differentiating said received video signals, means for applying the derived wave form to two channels, one adapted to invert input signals fed thereto, and the other adapted to delay input signals fed thereto, the delay being substantially equal to the transmitted radar pulse length, a coincidence detector connected to receive as its two inputs the outputs from the said two channels, and means for utilizing the output from the coincidence detector.

According to the present invention a pulsed radar system includes means for producing from each received video signal pulse a signal wave form consisting of two successive voltage excursions of opposite polarity, means for applying the produced wave form to two channels one of which is adapted to invert input signals fed thereto and the other of which is adapted to delay input signals fed thereto, the amount of the delay being different from the transmitted pulse length and less than the duration of the produced signal wave form resulting from a desired received pulse, a coincidence detector connected to receive as its two inputs outputs from the said two channels and means for utilizing the output from the coincidence detector. Each of the channels may contain a rectifier in which case, of course, the inputs to the coincidence detector will be rectified inputs. However, this is obviously not essential for the coincidence detector may itself be arranged, in known manner, also to provide rectification, or a rectifier may be provided, if required, at some convenient point following the coincidence detector.

Preferably the amount of the delay is less than half the duration of the produced signal wave form resulting from a desired received pulse and may be considerably less than the transmitted radar pulse length, e.g. it may be, for example, 0.4 of that duration.

It is possible to produce the aforesaid produced signal wave form by differentiating received video signals but preferably it is produced, as in the parent specification, by inverting the received video signals and delaying them by a time approximately equal to the transmitted radar pulse length and additively combining the inverted delayed video signals with the original received video signals. Preferably, as in the parent specification, the received video signals are inverted and delayed and the resultant inverted delayed video signals are additively combined with said received video signals by means of a reflecting delay line having an overall delay time (go and return) approximately equal to the transmitted radar pulse length and which is branched off a signal path through which said received signals are fed to the aforesaid two channels. The coincidence detector may be of any kind known per se, e.g. a multi-grid gating valve, such as a short suppressor grid base pentode, having two input grids one of which is fed from one of the aforesaid two channels and the other of which is fed from the other, said valve being so biased and operated as to provide an output from its anode only in response to signals coincidentally applied to both its input grids.

Preferably the receiver proper (which forms per se no part of this invention and may be of any form known per se) for obtaining the video signals from which the aforesaid produced wave form is obtained is designed and dimensioned in accordance with known principles to have a logarithmic rather than a linear input-output amplitude characteristic. This has the advantage that a wider range of amplitudes may be admitted without losing (due to limiting action) wanted targets in clutter.

The present invention, in its preferred embodiments—those in which the delay provided in the delaying and rectifying channel is less than half the duration of the aforesaid produced signal wave form—has a number of advantages over the parent invention according to which the said delay is made substantially equal to the transmitted radar pulse length. The first and probably the most important advantage is that there is discrimination not only against interfering pulses which are longer than the transmitter radar pulse length (as with the parent invention) but also against interfering pulses which are shorter than said length. There is no critical value for the delay to be provided, in carrying out this invention, in the delaying and rectifying channel. It may, indeed, be very short, the lower limit of the delay being a purely practical one set by the requirement that the duration of the time of coincidence of the outputs from the two channels must be sufficient to secure reliable operation of the coincidence detector and the requirement that the output pulses from the coincidence detector must be long enough to be displayed satisfactorily.

A second advantage is manifested when the said invention is applied to radar stations in which, in order to obtain adequate energy content in the transmitted pulses, the said pulses are made longer than they would be if the criterion underlying choice of pulse length was precision of range measurement. In determining range it is usual to estimate by eye, in the display, the positions of the centers of the received pulses and, obviously, the longer the received pulses, the more difficult it is to estimate with precision the positions of their centers. In those embodiments of the present invention in which the delay in the rectifying and delaying channel is made shorter than the transmitted pulse length (the duration of the produced wave form will normally be about twice the transmitted pulse length) the output pulses from the coincidence detector are correspondingly shorter than the received pulses, and therefore the effect, from the point of view of precision of range estimation, is as though correspondingly shorter transmitted pulses were used.

A third advantage which may be obtained—experiments so far made indicate that it is obtained though they have not been extensive enough to establish this as a fact—is that there is an improved signal/noise ratio.

Figure 6:
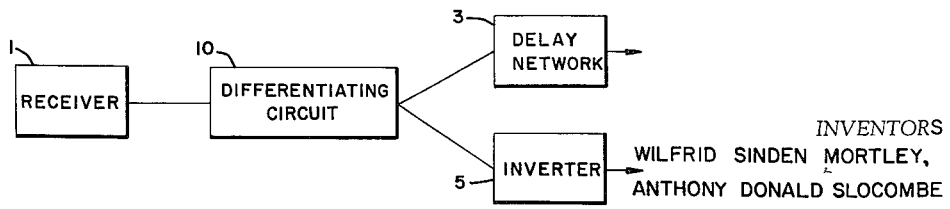

The invention is illustrated in and further explained in connection with the accompanying drawings in which FIGURE 1 is a block diagram of a preferred embodiment of the invention showing a radar station only so far as is necessary to an understanding of the present invention, and FIGURES 2, 3, 4 and 5 are graphical explanatory figures. FIGURES 5(a) through 5(f) are graphical representations of wave forms occurring at various points in the radar system of this invention, and FIGURE 6 is a block diagram of another illustrative embodiment of this invention.

Referring to the drawings, video input signals including echoes from desired targets, echoes from clutter targets and the inevitable accompanying noise are derived in any manner per se in pulsed radar practice by a known receiver 1 which preferably is one having a logarithmic input-output amplitude characteristic. Video signals from this receiver 1 are fed through a resistance 1a over a path 2 to the input sides of two channels, one of which consists of a delay unit 3 followed by a half-wave rectifier 4 and the other of which consists of an inverter 5 followed by a half-wave rectifier 6.

Branched from the path 2 is a reflecting delay line 7 constituted by a known delay line short-circuited at one end and having its other connected to the said path 2. The resistance 1a is made equal to the characteristic impedance of the delay line 7. The end-to-end electrical length of the delay unit 7 is one half the length of the transmitted radar pulse so that the delay which it will impose upon a signal which enters it, is reflected from the far end, and re-emerges at the path 2 will be equal to the radar pulse length. The emergent signals from the delay unit 7 will also, of course, be inverted.

The delayed inverted signals from the delay unit 7 are added to the input signals from the receiver 1 so that there will appear, at the common input point of the two channels which commence respectively with the delay unit 3 and the inverter 5 a produced wave form consisting of two successive voltage excursions of opposite polarity.

The delay introduced by the delay unit 3 may exceed the transmitted radar pulse length, but if it does it must be less than the duration of the aforesaid produced wave form resulting from a received pulse having the duration of the transmitted pulse. Preferably, however, this delay is substantially less then the length of the transmitted radar pulse length, i.e. substantially less than half the length of the aforesaid produced wave form. To quote a practical example, which is, however, only an example, the delay introduced by the unit 3 may be 0.4T where T is the length of the transmitted pulse.

The outputs from the two channels are fed to the two input terminals of any known form of coincidence detector 8, e.g. a short suppressor grid base pentode having the two signals (from unit 4 and unit 6) applied to its control and suppressor grids and so biased that it produces an anode output only in response to coincidentally applied signals to both these grids. The resultant output from the coincidence detector 8 is applied to any convenient suitable known utilization circuits and display apparatus as represented in FIGURE 1 merely by the rectangle 9.

Figure 2:
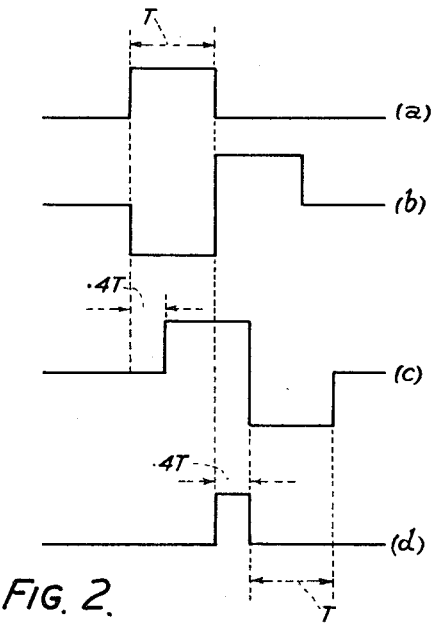

FIGURE 2 shows various typical and idealized wave forms appearing at different points in the circuit of FIGURE 1. Each lettered line in FIGURE 2 shows the wave form at the correspondingly lettered point in FIGURE 1. The dimension T in FIGURE 2 is the length of the received echo pulse from a desired target and is assumed to be the same as the transmitted radar pulse. Line (a) of FIGURE 2 shows a received pulse from a desired target as it would appear at terminal 1. Line (b) shows the produced wave form, due to the action of the reflecting delay line 7, after inversion by the inverter 5 and as it would appear at point (b). Line (c) shows the same wave form as it would appear at point (c) after being delayed by the delay line 3 by an amount which, in this example is 0.4T. Line (d) shows the resultant output pulse at point (d) from the coincidence detector 8. It will be observed that this pulse is only 0.4T long. The corresponding pulse obtained from the coincidence detector 8 of an arrangement illustrated and described in the parent specification would be of length T.

Figure 3:
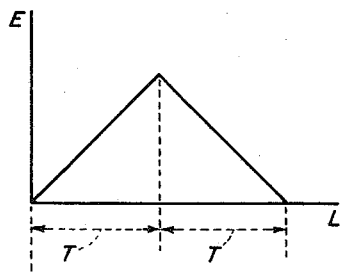
Figure 4:
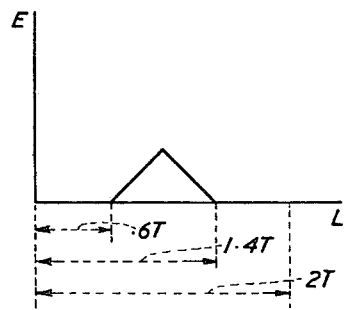
Figure 5A:
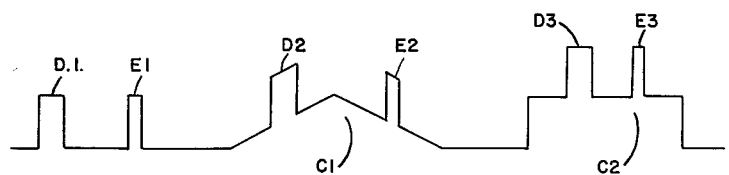
Figure 5B:
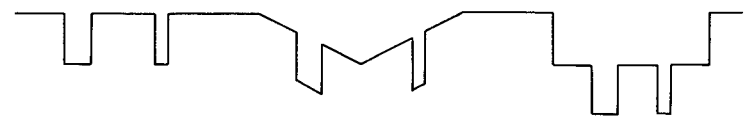
Figure 5C:
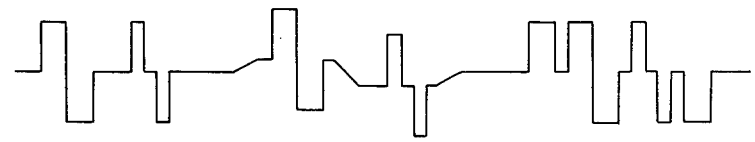
Figure 5D:
Figure 5E:
Figure 5F:
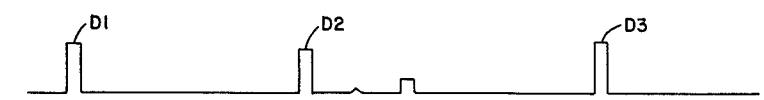

The present invention distinguishes desired targets, such as aircraft, from "clutter" targets, such as turbulent rain storms in the same general way as does the parent invention but, in the preferred embodiments of the present invention in which the delay introduced by the delay unit 3 is less than the transmitted pulse length, it provides improvement by also discriminating against interfering pulses which are shorter than the transmitter pulse length. This improvement will be better understood from FIGURES 3 and 4 in both of which energy content of output pulses from discriminator 8 are plotted as ordinates against lengths of pulses appearing at receivers 1. FIGURE 3 is drawn for an arrangement as described and illustrated in the parent specification and relates the pulse energy E of an output pulse from discriminator 8 of FIGURE 1 of the parent specification to the length L of the received pulse from a desired target and appearing at receiver 1 of that figure. FIGURE 4 is a similar figure drawn for an embodiment of the present invention wherein the delay provided by the delay unit 3 is 0.4 of the length of the received pulse from a desired target at receiver 1 of FIGURE 1. This length is taken as being the same as the transmitted pulse length T, shown in both FIGURES 3 and 4.

In FIGURE 5, received pulses are traced through the system, which pulses have a duration less than that of the transmitted pulse and are therefore eliminated. FIGURE 5(a) is the wave form occurring at receiver 1 of FIGURE 1; FIGURE 5(b) is the output delayed wave form of delay line 7; FIGURE 5(c) is the resultant wave form appearing on conductor 2 due to the combination of wave forms 5(a) and 5(b). FIGURE 5(d) is the delayed rectified wave form occurring at the output of rectifier 4. FIGURE 5(e) is the inverted rectified wave form appearing at the output of rectifier 6, and FIGURE 5(f) is the output of a coincidence detector 8. These wave forms relate to the arrangement as previously described in the specification in which the delay of delay line 3 is equal to 0.4 times the transmitted pulse length. In FIGURE 5(a) the pulses D–1, D–2, and D–3 are echo pulses resulting from targets which are to be displayed. These pulses each have a duration equal to that of the transmitted pulses. Pulses C–1 and C–2 are "clutter" pulses having a duration much greater than the transmitted pulse and pulses E–1, E–2, and E–3 are unwanted interfering pulses having a duration less than that of the transmitted pulse. It will be seen from the wave form of FIGURE 5(f) that all pulses other than the D–1, D–2, and D–3 are substantially eliminated and that the resultant output pulses from coincidence detector 8 have a duration less than that of the corresponding input pulses. FIGURE 6 is a block diagram of a portion of another illustrative embodiment of this invention in which the output of the receiver is fed to the differentiating circuit 10 of a type well known in the art and the output of differentiating circuit 10 is fed to delay network 3 and inverter 5. The remainder of the system corresponds to that shown in FIG. 1.

We claim:

1. A pulsed radar system including a receiver, means connected to said receiver for producing from each received video signal pulse a signal wave form consisting of two successive voltage excursions of opposite polarity, means for applying the produced wave form to two channels one of which is adapted to invert input signals fed thereto and the other of which is adapted to delay input signals fed thereto, the amount of the delay being different from the transmitted pulse length and less than the duration of the produced signal wave form resulting from a desired received pulse, a coincidence detector connected to receive as its two inputs the outputs from the said two channels and means for utilizing the output from the coincidence detector.

2. A system as claimed in claim 1 wherein each of the two channels also includes a rectifier.

3. A radar system as claimed in claim 1 wherein the amount of the delay is substantially less than half the duration of the produced signal wave form resulting from a desired received pulse.

4. A radar system as claimed in claim 1 wherein the received video signals are inverted and delayed and the resultant inverted delayed video signals are additively combined with said received video signals by means of a reflecting delay line having an overall delay time (go and return) approximately equal to the transmitted radar pulse length and which is branched off a signal path through which said received signals are fed to the aforesaid two channels.

5. A radar system as claimed in claim 1 wherein the receiver for obtaining the video signals from which the produced wave form is obtained is designed and dimensioned to have a logarithmic input-output amplitude characteristic.

6. A radar system as claimed in claim 1 wherein the means for applying the produced waveform to two channels includes a differentiating circuit whereby the produced waveform is obtained by differentiating the received video signals.

7. A radar station including a source of received video signals; two channels, one including a delay unit providing a delay which is substantially less than the transmitted radar pulse length followed by a half-wave rectifier and the other including a signal inverter followed by a half-wave rectifier; a signal path leading from said source to the input ends of both said channels; a delay line short-circuited at one end so as to be reflecting at that end and providing an overall delay (go and return) approximately equal to said radar pulse length said delay line having its un-short circuited end connected to said signal path; a coincidence detector having one input fed with the rectified output from one channel and the other input fed with the rectified output from the other channel; and means for utilizing output signals from said coincidence detector.

References Cited in the file of this patent
UNITED STATES PATENTS
2,523,283   Dickson _____ Sept. 26, 1960